(12) United States Patent
Buschmann

(10) Patent No.: US 9,844,872 B1
(45) Date of Patent: Dec. 19, 2017

(54) DETERMINING SENSOR PARAMETERS AND MODEL PARAMETERS OF A ROBOT

(71) Applicant: X Development LLC, Mountain View, CA (US)

(72) Inventor: Thomas Buschmann, Mountain View, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 226 days.

(21) Appl. No.: 14/797,912

(22) Filed: Jul. 13, 2015

(51) Int. Cl.
| | |
|---|---|
| *G05B 19/04* | (2006.01) |
| *G05B 19/18* | (2006.01) |
| *B25J 9/16* | (2006.01) |
| *G05B 19/406* | (2006.01) |

(52) U.S. Cl.
CPC ........... *B25J 9/163* (2013.01); *B25J 9/162* (2013.01); *B25J 9/1633* (2013.01); *B25J 9/1653* (2013.01); *G05B 19/406* (2013.01)

(58) Field of Classification Search
CPC . B25J 9/163; B25J 9/162; B25J 9/1687; B25J 9/1692; B25J 9/1682; B25J 9/1656; B25J 9/1633; B25J 9/1697; G05B 19/42; G05B 19/425; G05B 19/4061; G05B 19/4163; G05B 19/4083; G01S 19/34
See application file for complete search history.

(56) References Cited

U.S. PATENT DOCUMENTS

| | | | |
|---|---|---|---|
| 4,620,436 A | 11/1986 | Hirabayashi et al. | |
| 4,815,006 A | 3/1989 | Andersson et al. | |
| 5,201,772 A | * 4/1993 | Maxwell | A61F 5/0102 434/258 |
| 5,400,244 A | * 3/1995 | Watanabe | G05D 1/0242 180/404 |
| 6,070,109 A | 5/2000 | McGee et al. | |
| 6,382,012 B2 | 5/2002 | Hara et al. | |
| 7,904,202 B2 | 3/2011 | Hoppe | |

(Continued)

OTHER PUBLICATIONS

An, C. H., Atkeson, C. G., & Hollerbach, J. M. (Dec. 1985). Estimation of Inertial Parameters of Rigid Body Links of Manipulators. In Decision and Control, 1985 24th IEEE Conference on (pp. 990-995). IEEE.

(Continued)

*Primary Examiner* — Rachid Bendidi
(74) *Attorney, Agent, or Firm* — Middleton Reutlinger

(57) ABSTRACT

Methods, apparatus, systems, and computer readable media are provided for determining: 1) sensor parameters for sensors of a robot and 2) model parameters of a dynamic model of the robot. The sensor parameters and model parameters are determined based on applying, as values for known variables of a system equation of the robot, sensor readings and position values for each of a plurality of instances of a traversal of the robot along a trajectory. The system equation of the robot is a dynamic model for the robot that includes sensor models substituted for one or more corresponding variables of the dynamic model. The system equation includes unknown variables representing unknown sensor biases for the sensors of the robot and unknown model parameters of the dynamic model of the robot. Solutions to the unknown variables are generated and utilized to determine the sensor parameters and the model parameters.

15 Claims, 5 Drawing Sheets

(56) References Cited

U.S. PATENT DOCUMENTS

| | | |
|---|---|---|
| 8,265,792 B2 | 9/2012 | Wampler, II et al. |
| 2007/0067678 A1* | 3/2007 | Hosek ............... G05B 23/0235 714/25 |
| 2013/0079928 A1 | 3/2013 | SøE-Knudsen et al. |
| 2014/0067124 A1* | 3/2014 | Williamson ......... G05B 19/406 700/258 |

OTHER PUBLICATIONS

Zhong, X. L., & Lewis, J. M. (May 1995). A New Method for Autonomous Robot Calibration. In Robotics and Automation 1995. Proceedings., 1995 IEEE International Conference on (vol. 2, pp. 1790-1795). IEEE.

Vuong, N. D., & Ang Jr, M. H. (2009). Dynamic Model Identification for Industrial Robots. Acta Polytechnica Hungarica 6(5), 51-68.

Gautier, M., Vandanjon, P. O., & Janot, A. Dynamic Identification of a 6 Dof Robot Without Joint Position Data. 2011 IEEE International Conference on Robotics and Automation (ICRA 2011), May 2011, France. pp. 234-239.

Wampler, C. W., Hollerbach, J. M., & Arai, T. (1995). An Implicit Loop Method for Kinematic Calibration and its Application to Closed-Chain Mechanisms. Robotics and Automation, IEEE Transactions on, 11(5), 710-724.

Hollerbach, J., & Nahvi, A. (1997). Total Least Squares in Robot Calibration. In Experimental Robotics IV (pp. 274-282). Springer Berlin Heidelberg.

\* cited by examiner

DETERMINING SENSOR PARAMETERS AND MODEL PARAMETERS OF A ROBOT

BACKGROUND

Dynamic models of robots are utilized in the implementation of many robot control schemes to predictably control the robots. It is important to accurately determine the parameters of a robot's dynamic model to enable accurate and predictable control of the robot. Sensors of a robot are also utilized in the implementation of many robot control schemes and/or other functions of a robot. For example, sensor readings of one or more sensors of the robot may be utilized to adapt control of the robot, determine the occurrence of certain events during control of the robot, etc. It is also important to accurately calibrate the sensors of a robot to enable appropriate utilization of sensor readings provided by those sensors.

Various techniques exist for determining parameters of the dynamic model of a robot. For example, although tedious, some parameters may be determined by dismantling the robot and physically measuring various robot components link by link. Also, for example, some techniques collect torque values for a robot while the robot is traversing a planned trajectory and utilize the collected values to determine one or more model parameters. Various separate and distinct techniques also exist for calibrating sensors of a robot. For example, some techniques cause the robot to interact with one or more particular objects in a predetermined manner and compare measured sensor readings to reference sensor readings to calibrate the sensor.

However, the above techniques fail to enable determination of both 1) a sensor parameter for each of one or more sensors of a robot and 2) one or more model parameters of a dynamic model of the robot based on the same traversal of a robot along a trajectory.

SUMMARY

The present disclosure is generally directed to determining: 1) a sensor parameter for each of one or more sensors of a robot and 2) one or more model parameters of a dynamic model of the robot based on readings from sensors of the robot during traversal of the robot along a trajectory. In some implementations, the sensor parameters and model parameters may be determined based on the same group of sensor readings from a traversal of the robot along the trajectory. The sensor parameter of a sensor may be, for example, a sensor bias of the sensor. Sensor bias of a sensor is the signal output from the sensor when the signal output should be null. For example, for a torque sensor that provides signal output from −5 VDC to +5 VDC depending on the amount and direction of torque, the torque sensor signal output should be 0 VDC when no torque is applied. If the torque sensor signal output is 0.1 VDC when no torque is applied, then the torque sensor has a bias of 0.1 VDC. Model parameters of a dynamic model of a robot each define a physical parameter of one or more components of the robot. For example, model parameters for a joint and a component that moves with the joint may include mass of the component, inertia of the component, center of gravity of the component, and/or a friction coefficient of the joint.

To determine the sensor parameters and the model parameters, the robot is traversed along a trajectory. The trajectory may be a set trajectory and/or a random or otherwise determined trajectory. A sensor reading for each of one or more sensors of the robot and a position value (e.g., joint angle) for each of one or more actuators of the robot are determined for each of a plurality of instances of the traversal along the trajectory. Accordingly, a plurality of instances are determined, where each of the instances includes sensor reading(s) and position value(s) at that instance. The readings and values for each instance may be expressed as a vector of values $[s_1, \ldots s_m, q_1, \ldots q_n]$, where s represents a reading for a respective sensor for a respective instance, m represents the number of sensors, q represents the position reading for a respective actuator for the respective instance, and n represents the number of actuators. In some implementations m may be equal to n. In some implementations, the determined position values of an instance may be utilized to derive velocity and acceleration values for the instance.

The sensor readings, position values, derived velocity and acceleration values, and/or other values for each instance of a group of the instances are used to calculate the sensor parameters and the model parameters. The group of the instances may include all of the determined instances or may include less than all of the determined instances. For example, in some implementations the group of the instances may be a group that has been filtered to reduce noise and signal content related to unmodeled high-frequency dynamics. Also, for example, in some of those and/or other implementations, the group of instances may be a group that has been downsampled to reduce computational costs in one or more downstream steps of determining sensor parameters and model parameters.

In some implementations, the sensor parameters and the model parameters are calculated based on using the values for each instance in the group as values for known variables of a system equation of the robot. The system equation of the robot is a dynamic model for the robot (e.g., an equation of motion for the robot) that includes sensor model(s) substituted for one or more corresponding variables of the dynamic model. The unknown variables of the system equation include the sensor parameter(s) for the sensor(s) and the model parameter(s) to be determined for the robot.

Accordingly, a group of system equations may be generated with each of the system equations of the group having values for known variables (sensor readings, position values, etc.) that are based on a respective one of the time instances and having the same unknown variables (the sensor parameter(s) and model parameter(s) to be solved). In some implementations, the group of generated system equations includes enough members so that an overdetermined system of equations is generated. In some of those implementation, the group of system equations may be stacked and a plurality of the unknown variables solved using a suitable procedure such as a least squares fitting procedure. The sensor parameters and the model parameters may be determined from the solved unknown variables.

In some implementations, a computer implemented method may be provided that includes determining, for each of a plurality of instances of a traversal of a robot along a trajectory: sensor readings for a plurality of sensors of the robot, each of the sensor readings corresponding to a respective one of the sensors; and position values for a plurality of actuators of the robot, each of the position values corresponding to a respective one of the actuators. The method further includes applying the sensor readings and the position values for each of the instances of a group of the instances as values for known variables of a system equation of the robot. The system equation includes the known variables and unknown variables. The unknown variables represent unknown sensor biases for the sensors of the robot and unknown model parameters of a dynamic model of the robot. The method further includes: generating a solution to each of a plurality of the unknown variables based on the applied sensor readings and position readings for the group of the instances, determining sensor biases based on the solutions to the unknown variables representing the unknown sensor biases, and determining model parameters based on the solutions to the unknown variables representing the unknown model parameters. The method further includes applying a correction to at least one of the sensors of the robot based on the determined sensor bias for the sensor and applying the model parameters to the dynamic model of the robot.

This method and other implementations of technology disclosed herein may each optionally include one or more of the following features.

In some implementations, the method further includes: determining velocity values and acceleration values for each of the instances of the group based on the position values; and applying the velocity values and the acceleration values for each of the instances of the group as values for additional known variables of the system equation. Generating the solution to each of the plurality of the unknown variables may be further based on the velocity values and the acceleration values. In some of those implementations the method further includes: identifying gain values for the sensors of the robot; and applying the gain values for each of the instances of the group as values for further known variables of the system equation. Generating the solution to each of the plurality of the unknown variables may be further based on the gain values.

In some implementations the system equation is an equation of motion that includes sensor models substituted for a plurality of the variables of the equation of motion. The sensor models each include a sensor model known variable of the known variables and a sensor model unknown variable of the unknown variables. The sensor model unknown variable represents the unknown sensor biases and applying the sensor readings and the position values for each of the instances of the group as values for the known variables includes applying the sensor readings as the sensor model known variables. In some of those implementations the sensor models include torque sensor models for joint torque sensors of the sensors of the robot.

In some implementations, applying the sensor readings and the position readings for each of the instances of the group as the values for the known variables for a system equation of the robot includes generating a plurality of system equations by applying the sensor readings and the position readings for each of the instances of the group as the known variables of the system equation of the robot. In some of those implementations, generating the solution to each of a plurality of the unknown variables based on the applied sensor readings and position readings includes generating a solution to each of the plurality of the unknown variables based on the system equations. In some versions of those implementations, generating the solution to each of the plurality of the unknown variables based on the system equations may include applying a fitting procedure to generate the solutions, such as a least squares fitting procedure. In some versions of those implementations, generating the solution to each of the plurality of the unknown variables based on the system equations may include stacking the system equations and generating the solutions based on applying a least squares fitting procedure to the stacked system equations.

In some implementations, applying a correction to at least one of the sensors of the robot based on the determined sensor biases for the sensor includes applying a digital correction to future sensor readings of the sensor.

In some implementations, the method further includes controlling the actuators of the robot based on the dynamic model of the robot with the applied model parameters.

In some implementations, the method further includes traversing the robot along the trajectory.

Other implementations may include a non-transitory computer readable storage medium storing instructions executable by a processor to perform a method such as one or more of the methods described above. Yet another implementation may include a system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
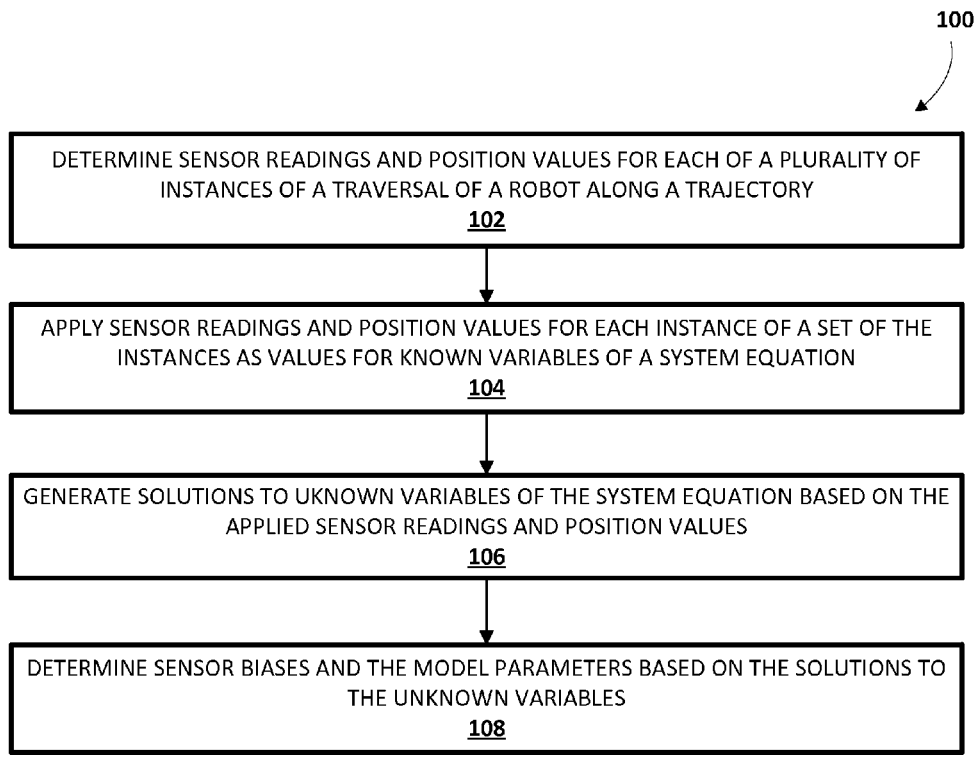
FIG. 1 depicts a flow chart illustrating an example method of determining a sensor parameter of one or more sensors of a robot and one or more model parameters of a dynamic model of the robot.

Referring now to FIG. 1, an example method 100 of determining a sensor parameter of one or more sensors of a robot and one or more model parameters of a dynamic model of the robot is illustrated. For convenience, the operations of method 100 are described with reference to a system that performs at least some of the operations and is described with reference to a robot in which the system is incorporated and/or with which the system communicates. This system may include various components, such as sensor and model parameters generation system 550 and/or logic 522 in FIG. 5. Also, for ease in explanation, many of the operations of method 100 are described with reference to an example robot 220 illustrated in FIG. 2. However, it is noted that the method may be applied to robots having more degrees of freedom than the robot 220, such as robot 320. While operations of method 100 are shown in a particular order, this is not meant to be limiting. One or more operations may be reordered, omitted, or added.

At block 102, the system determines sensor readings and position values for each of a plurality of instances of a traversal of a robot along a trajectory. For example, the robot may be traversed along a set, random, and/or otherwise determined trajectory and the system may determine, for each of a plurality of instances along that trajectory, sensor readings and position values. For instance, sensor readings and position values may be determined for five millisecond intervals along the trajectory, ten millisecond intervals along the trajectory, or at other periodic or non-periodic intervals. Accordingly, the system determines a plurality of instances of readings and values, where each of the instances includes sensor reading(s) and position values(s) at that instance. The sensor readings and position values for each instance may be expressed as a vector of values $[s_1, \ldots s_m, q_1, \ldots q_n]$, where s represents a reading for a respective sensor for a respective instance, m represents the number of sensors, q represents the position value for a respective actuator for the respective instance, and n represents the number of actuators. In some implementations m may be equal to n.

In some implementations, the system may use the determined position values of instances to derive velocity and acceleration values for each of one or more of the instances. For example, the system may take the first derivative of a position value at an instance to determine the velocity at that instance and may take the second derivative of the position value to determine the acceleration at that instance. Accordingly, the system may generate a plurality of instances that each include sensor reading(s), position value(s), velocity value(s), and acceleration value(s) at that instance. The readings and values for each instance may be expressed as a vector of values $[s_1, \ldots s_m, q_1, \ldots q_n, \dot{q}_1, \ldots \dot{q}_n, \ddot{q}_1, \ldots \ddot{q}_n]$, where s represents a reading for a respective sensor for a respective instance, m represents the number of sensors, q represents the position value for a respective actuator for the respective instance, $\dot{q}$ represents the velocity value for a respective actuator at the respective instance, $\ddot{q}$ represents the acceleration value for a respective actuator at the respective instance, and n represents the number of actuators.

Each of the sensor readings is a sensor reading from a respective sensor of the robot for which an unknown sensor parameter is to be determined. For example, the sensor readings may each be the output from a respective force sensor of a plurality of force sensors of the robot. The sensor readings may each be analog readings such as an analog voltage or current, or may each be digital readings such as a plurality of bits of data. The sensor readings each have a magnitude component that indicates a degree of the physical property which the sensor is detecting and may optionally have a direction component that indicates a direction of the physical property. As one non-limiting example, a sensor may generate analog sensor readings from −10 VDC to +10 VDC depending on the magnitude and direction (e.g., negative in a first direction, positive in an opposite direction) of the physical property sensed by the sensor. Each of the determined sensor readings may be a raw sensor reading. As used herein, a raw sensor reading is a sensor reading that has not been modified by a sensor gain and/or sensor bias of the sensor and/or that has not been converted to a unit of the physical property being measured. For example, the raw sensor reading of an analog force sensor may be a voltage generated by the sensor in response to a force measured by the sensor.

Each of the position values is for a respective actuator of the robot and indicates a position of the actuator. For example, a position value may indicate a joint angle of a joint whose joint angle is controlled by a servo motor actuator of the robot. In some implementations, the position values are determined based on readings from position sensors associated with the actuators. For example, a joint angle position value for an actuator may be determined based on a sensor reading for a position sensor associated with the actuator. For instance, the sensor reading may be provided as a joint angle or may be converted to a joint angle (e.g., based on a conversion formula and/or a mapping that maps sensor readings to corresponding joint angles).

Figure 2:
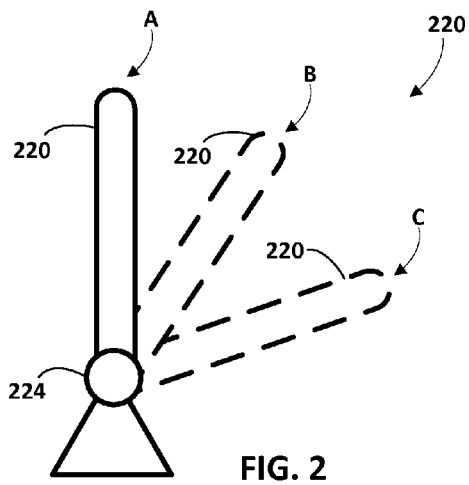
FIG. 2 illustrates an example robot that is a planar pendulum and illustrates three orientations of a set of orientations struck by the robot while traversing a trajectory.

With reference to FIG. 2, one example of determining sensor readings and position values for each of a plurality of instances of a traversal of a robot along a trajectory is described. FIG. 2 illustrates a robot 220 that is a planar pendulum. The robot 220 has a component 222 and an actuator (e.g., servo motor) that pivots the component 222 about a joint 224 to rotate the component 222 within a plane. In FIG. 2B, a current orientation of the component 222 within the plane is labeled as A and is illustrated in solid lines. Two prior orientations of the component 222 are labeled as B and C and are illustrated in broken lines. The actuator of the robot may cause the component 222 to pivot about the joint 224 to traverse the component along a trajectory during which the component 222 strikes the orientations A, B, and C, as well as additional orientations between the orientations A, B, and C.

The system determines a sensor reading and a position value for each of a plurality of instances of the traversal of the robot 220 along the trajectory. For example, the robot 220 may include a position sensor that senses the position of the joint 224 and may also include a torque sensor that senses the amount of torque at the joint 224. For each of a plurality of instances, the system may utilize the reading of the torque sensor at that instance as the sensor reading for that instance and may determine the position value at that instance based on the reading of the position sensor at that instance. In some implementations, the system may determine the position value for each instance by converting the position sensor reading for that instance.

At step 104, the system applies sensor readings, position values, and optionally velocity and acceleration values for each instance of a group of the instances as values for known variables of a system equation. The group of the instances may include all of the instances determined at block 102 or may include less than all of the determined instances. For example, in some implementations the system may filter a plurality of the instances determined at block 102 from the group to reduce noise and signal content related to unmodeled high-frequency dynamics. Also, for example, the system may additionally and/or alternatively downsample instances to reduce the number of instances that are included in the group. Downsampling instances may reduce computational costs in one or more downstream steps of determining sensor parameters and model parameters.

The system equation of the robot is a dynamic model for the robot, such as an equation of motion for the robot, that includes sensor model(s) substituted for one or more corresponding variables of the dynamic model. The system equation includes known variables such as the sensor readings, the position values, the velocity values, gravity, and a sensor gain. The system equation also includes unknown variables such as the sensor bias(es) for the sensor(s) and the model parameter(s) to be determined for the robot. The system applies the sensor readings, position values, and optionally velocity and acceleration values for each instance of a group of the instances as values for respective known variables. Accordingly, a group of system equations may be generated with each of the system equations of the group having values for known variables (sensor readings, position values, etc.) that are based on the values for a respective one of the time instances and having the same unknown variables (the sensor offset(s) and model parameter(s) to be solved).

With reference again to FIG. 2, one example of a system equation of the robot 220 and applying sensor readings and position, velocity, and acceleration values as values for known variables of the system equation is described. A system equation of the robot 220 may be the equation of motion of the robot 220, with a sensor model of a torque sensor for the joint 224 substituted for the torque variable in the system equation. The equation of motion of the robot 220 is $$l*\ddot{q}+\mu*\dot{q}+m*g*c*\sin(q)=\tau, \tag{1}$$

with $l$ being the inertia of the component 222, $\mu$ being the friction coefficient of the joint 224, m being the mass of the component 222, g being gravity, c being the distance from the joint 224 to a center of gravity of the component 222, q being the joint angle of joint 224, $\dot{q}$ being the velocity at the joint 224, $\ddot{q}$ being the acceleration at the joint 224, and $\tau$ being the torque acting on the joint 224.

A sensor model for the joint torque sensor for the joint 224 is:

$$a*v+b=\tau, \tag{2}$$

with v being the raw reading (e.g., voltage, current, or digital output) of the torque sensor, b being a bias of the torque sensor, and a being a gain parameter for the torque sensor.

The system equation that takes into account both the equation of motion and the sensor model for the joint torque sensor is:

$$l*\ddot{q}+\mu*\dot{q}+m*g*c*\sin(q)-b=a*v \tag{3}$$

The system may apply values for each of the instances of the group as values for known variables for the system equation (3) to generate a group of system equations. For example, the sensor reading, position value, velocity value, and acceleration values for the instance corresponding to position A may be utilized as known values to generate a system equation; the sensor reading, position value, velocity value, and acceleration values for the instance corresponding to position B may be utilized to generate another system equation; etc. Static known values of the system equation may also be applied to respective known variables for each of the system equations of the group such as gravity and the gain parameter for the torque sensor.

Stated otherwise, the model parameters $l$, $\mu$, and m, and the sensor bias b are unknown variables in the system equation (3) above. However, a may be a variable with a known value (e.g., a static value derived from the sensor spec sheet, measurements, etc.) and g is a variable with a known value. Moreover, v and q are variables with known values at each of the instances of the group. As also described above, the values for q can be utilized to derive $\dot{q}$ and $\ddot{q}$. Accordingly, for every instance in a group of instances in which readings for v and q were taken, a system equation can be generated that conforms to $$(\ddot{q}_i*\dot{q}_i*g*\sin(q_i)-1)p=av_i=:r_i, \tag{4}$$

where $p^T=(I, \mu, m*c, b)$ (the unknown variables) and where $q_i$, $\ddot{q}_i$, $\dot{q}_i$, g, and a are known variables for that time instance. For the instances of the group, the following overdetermined system can be determined by stacking the previous system equations:

$$Ap=r \tag{5}$$

where A is the regression matrix obtained by stacking the row vectors on the left side of equation (5) for all time instances.

At step 106, the system generates solutions to a plurality of unknown variables of the system based on the applied sensor readings, the applied position values, and the optionally applied velocity and acceleration values. For example, the system may generate solutions to the unknown variables based on applying a fitting procedure to generate the solutions. For instance, where the overdetermined system (5) is determined by stacking system equations with applied values for the known variables, the unknown variables may be determined using a least squares fitting procedure for calculating p to minimize:

$$(Ap-r)^T(Ap-r). \tag{6}$$

where A is the regression matrix and r is the residual. In some implementations, the system may utilize other techniques, such as other fitting procedures, to generate the solutions to the unknown variables.

At step 108, the system determines the sensor biases and the model parameters based on the solutions to the unknown variables. In some implementations, the system utilizes the solutions to the unknown variables as respective of the sensor biases and the model parameters without modification. In other implementations, the system may determine the sensor biases and/or the model parameters based on slight modifications of the solutions. In some implementations, the system determines all of the model parameters based on the solutions to the unknown variables. In some other implementations, the system determines a subset of the model parameters based on the solutions to the unknown variables. For example, in some situations solutions to unknown variables corresponding to a subset of the model parameters can be determined by analyzing the regression matrix, but other unknown variables may be identified as not influencing measurements for the executed trajectory. In some of those situations the subset of the model parameters may be determined based on the solutions to the corresponding unknown variables, but the other model parameters that correspond to the unknown variables identified as not influencing measurements may not be determined.

The system may apply a correction to one or more of the sensors that have a determined bias that exceeds a threshold value such as zero. For example, for a sensor that has a bias of +0.05 VDC, the system may apply a digital correction to future readings of the sensor to adjust those readings by +0.05 VDC before the readings are utilized to determine the torque measured by the sensor. The system may further apply the determined model parameters to dynamic model of the robot. For example, the system may apply the model parameters to a forward and/or inverse dynamic model of the robot. The dynamic model with the applied model parameters may be utilized to generate control commands for controlling the actuators of the robot.

Figure 3:
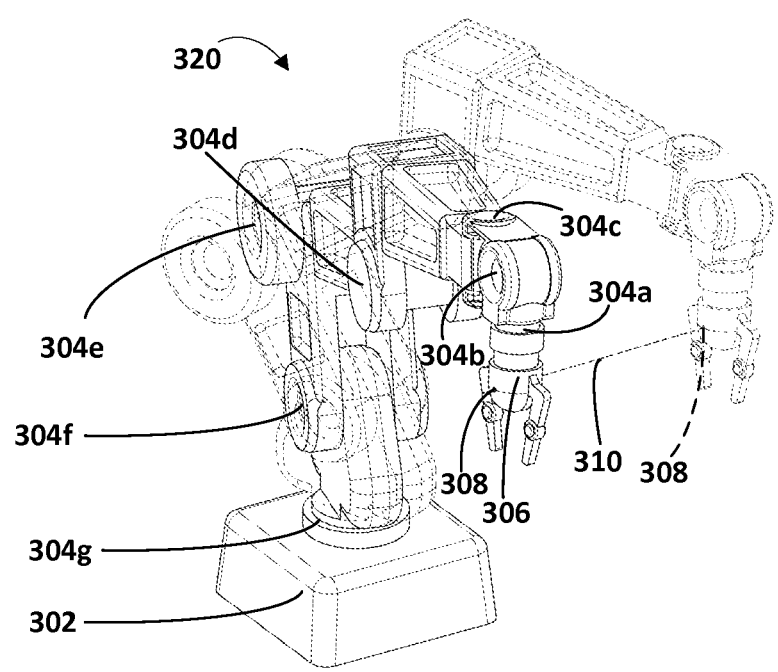
FIG. 3 illustrates another example robot, illustrates the positions traversed by a reference point of the robot while traversing a trajectory, and illustrates two orientations of a set of orientations struck by the robot while traversing the trajectory.

FIG. 3 illustrates another example robot 320 (in a form often referred to as a "robot arm") that includes a base 302 and a plurality of joints, seven of which are referenced in FIG. 3 with 304a-g. One or more (e.g., all) of the joints 304a-g may be independently controllable by a respective actuator, although this is not required. As used herein, an "actuator" of a robot may refer to motors (e.g., servo motors), pumps (e.g., air or liquid), pistons, drives, or other components that may create and/or undergo propulsion, rotation, and/or motion. Robot 320 also includes an end effector 306. As used herein, "end effector" may refer to a variety of tools that may be operated by robot 320 in order to accomplish various tasks. In FIG. 3, for example, end effector 306 takes the form of a gripper with two opposing "fingers" or "digits." End effector 306 may define an abstract reference point 308. Reference point 308 may be a point of end effector 306 that follows a particular path when robot 320 traverses a particular trajectory.

FIG. 3 includes a path 310 that illustrates the positions traversed by the reference point 308 of the robot 320 during traversal of the robot 320 along a trajectory. FIG. 3 also illustrates an orientation of the robot 320 at the beginning of the trajectory (illustrated in broken lines) and a current orientation of the robot 320 (illustrated in solid lines). The numbering of various components of the broken line version of robot 320 is omitted in FIG. 3 for the sake of simplifying the figure.

FIG. 3 is provided as one example of a more complex robot (relative to the robot 220 of FIG. 2) for which techniques disclosed herein may be applied. For example, the robot 320 may include a torque sensor for each of the joints 304a-g and may also include a position sensor for each of the joints 304a-g. Sensor readings for the torque sensors may be determined at each of a plurality of instances of the trajectory traversed by the robot 320 that is indicated by FIG. 3. Position values may also be determined for each of the instances based on readings of the position sensors and the position values may be utilized to derive velocity and acceleration values.

The sensor readings, position values, velocity values, and acceleration values for each instance of a group of the instances may be applied as values for known variables of a system equation of the robot 320 that includes sensor models of the torque sensors substituted for respective torque variables. It is understood that the system equation for the robot 320 will be more complex than the system equation (3) set forth above for the robot 220. The system equation may be obtained, for example, from Newton-Euler and/or Lagrangian equations. For example, the system equation may be an inverse dynamic model that calculates an actuator torque for each of the actuators of the robot 320 as a function of the position values, velocity values, and acceleration values for each of the joints 304a-g. As described above, the system equation may substitute the actuator torques with sensor models for the torque sensors of the robot 320.

Solutions to unknown variables of the system equation may be generated based on the applied sensor readings, position values, velocity values, and acceleration values. For example, the solutions to the unknown variables may be generated by applying a fitting procedure to a plurality of system equations generated based on the applied readings and values. The sensor biases and the model parameters may be determined based on the solutions to the unknown variables.

Figure 4:
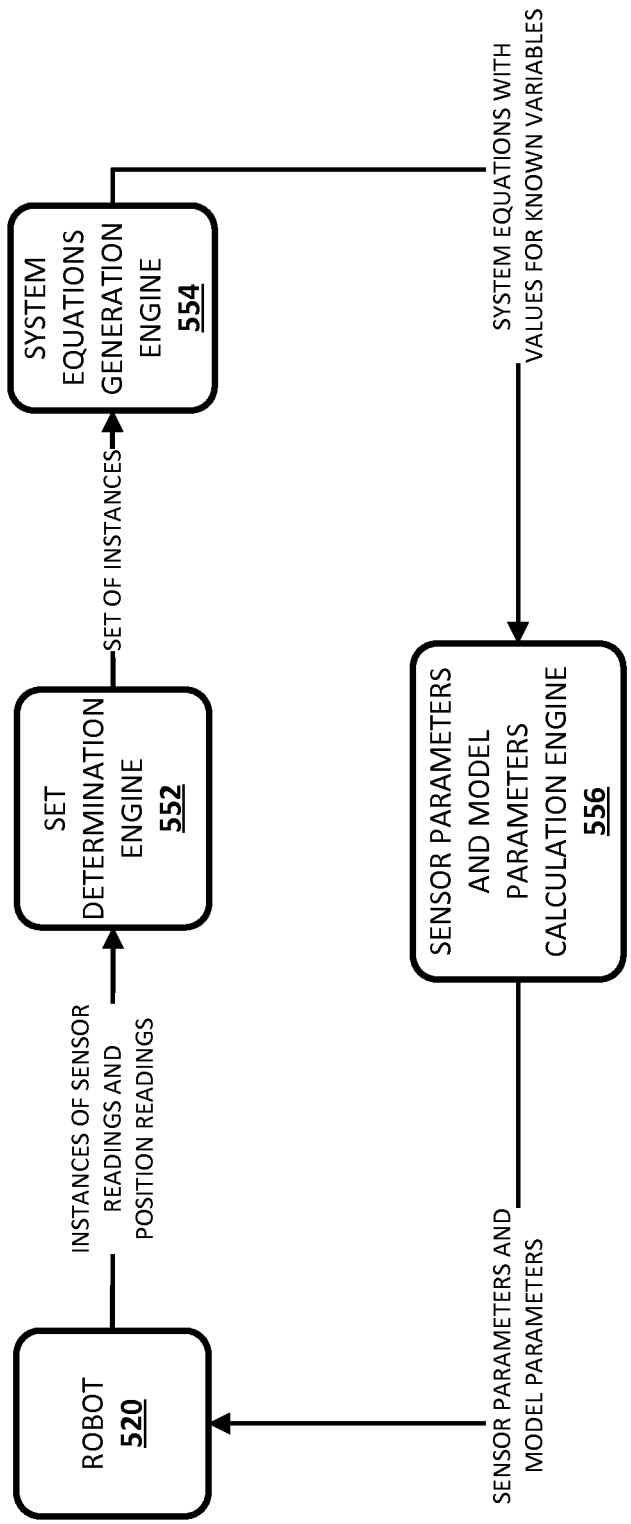
FIG. 4 illustrates an example of determining a sensor parameter of one or more sensors of a robot and one or more model parameters of a dynamic model of the robot, and updating the robot based on the determined sensor parameters and model parameters.

With reference to FIG. 4, an example of determining a sensor parameter of one or more sensors of a robot and one or more model parameters of a dynamic model of the robot, and updating the robot based on the determined sensor parameters and model parameters is provided.

Robot 520 provides instances of sensor readings and position readings to group determination engine 552. For example, the robot 520 may traverse a trajectory and provide sensor readings and position readings for each of a plurality of time instances during the traversal. For instance, the robot 520 may provide the instances in real time during the traversal and/or may buffer one or more of the instances and provide the buffered instances in non-real time (optionally following the traversal). The traversed trajectory may be a set, random, and/or otherwise determined trajectory. In some implementations, the trajectory is one that causes actuators of the robot to encounter a variety of different positions, velocities, and accelerations so as to promote diversity in the provided instances of sensor readings and position readings.

The group determination engine 552 may optionally convert the position readings of a plurality of the instances to position values and may also generate velocity and acceleration values for each of a plurality of the instances based on the position values. The group determination engine 552 may further filter a plurality of the instances received from the robot 520 to reduce noise and/or may additionally and/or alternatively downsample instances to reduce the number of instances. The group determination engine 552 provides, to system equations generation engine 554, a group of the filtered and/or downsampled instances. Each of the instances of the group include sensor readings, position values, velocity values, and acceleration values for that instance.

The system equations generation engine 554 applies the sensor readings, position values, velocity values, and acceleration values for each instance of a group of the instances as values for known variables of a system equation of the robot 520. Accordingly, the system equations generation engine 554 generates a group of system equations with each of the system equations of the group having values for known variables (sensor readings, position values, etc.) that are based on the values for a respective one of the time instances and having the same unknown variables (the sensor parameters and model parameters to be solved).

The system equations generation engine 554 provides the system equations with the values for the known variables to the sensor parameters and model parameters calculation engine 556. The sensor parameters and model parameters calculation engine 556 generates solutions to unknown variables of the system equations based on the system equations with the values for the known variables. For example, the engine 556 may generate solutions to the unknown variables based on applying a fitting procedure to generate the solutions. In some implementations, the engine 556 utilizes the solutions to the unknown variables as respective of the sensor parameters and the model parameters without modification. In other implementations, the system may determine the sensor parameters and/or the model parameters based on slight modifications of the solutions.

The sensor parameters and model parameters calculation engine 556 provides the sensor parameters and the model parameters to the robot 520. The robot 520 may apply a correction to one or more of the sensors based on respective of the determined sensor parameters. The robot 520 may further apply the determined model parameters to its dynamic model. The robot 520 may utilize the dynamic model with the applied model parameters to generate control commands for controlling the actuators of the robot according to a specified path.

Figure 5:
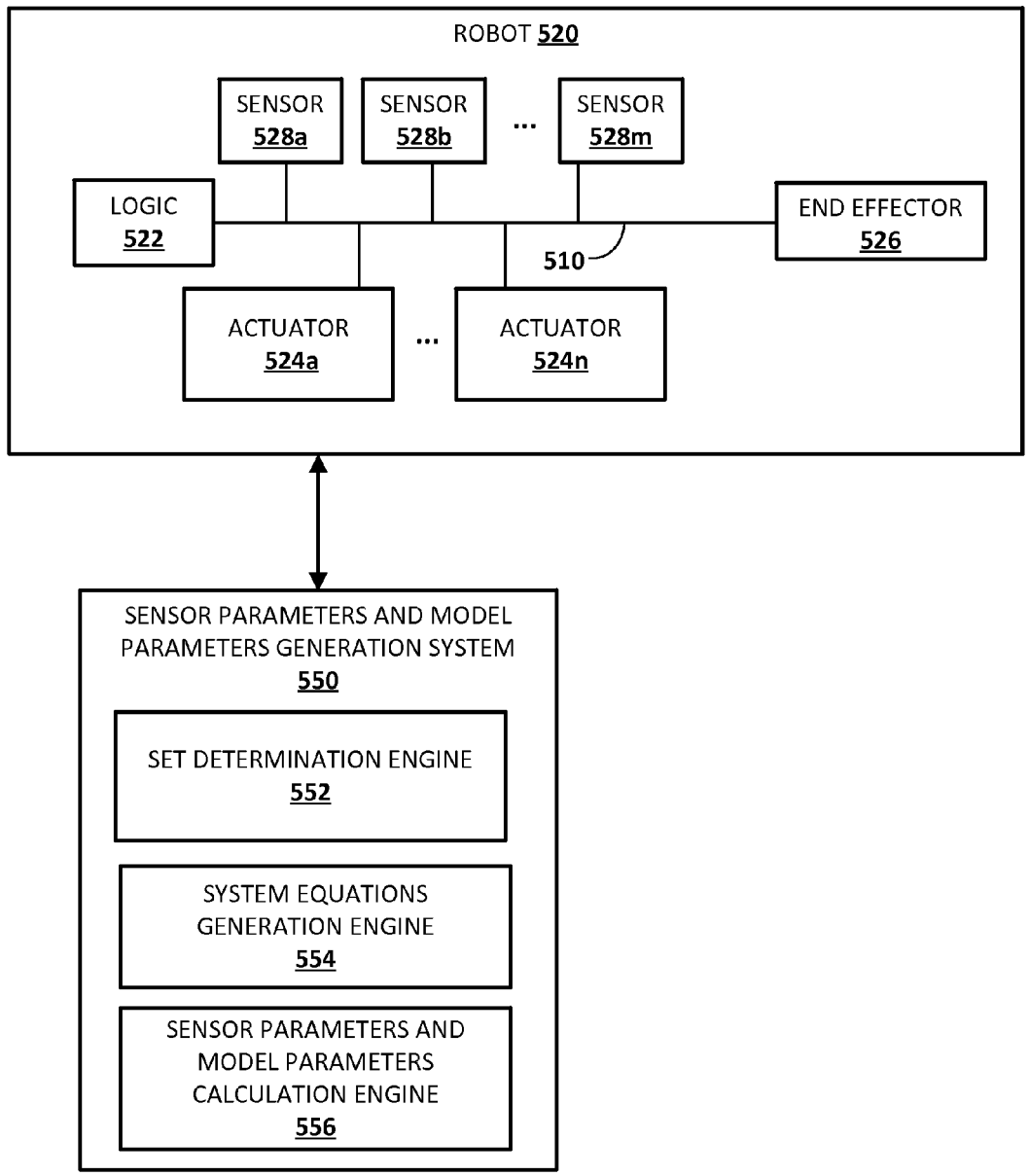
FIG. 5 illustrates an example environment in which disclosed techniques may be implemented.

FIG. 5 is a schematic diagram of an example environment in which disclosed techniques may be implemented. A robot 520 may be in communication with a sensor parameters and model parameters generation system 550. Robot 500 may take various forms, including but not limited to robot 220, a robot arm similar to robot 320 described above, a humanoid form, an animal form, a wheeled device, a submersible vehicle, an unmanned aerial vehicle ("UAV"), and so forth. In various implementations, robot 520 may include logic 522. Logic 522 may take various forms, such as one or more processors, one or more field-programmable gate arrays ("FPGA"), one or more application-specific integrated circuits ("ASIC"), one or more so-called "real time controllers," and so forth.

In various implementations, logic 522 may be operably coupled with one or more actuators 524a-n and/or one or more sensors 528a-m, e.g., via one or more buses 510. Sensors 528a-m may take various forms, including but not limited to torque sensors, pressure sensors, proximity sensors, accelerometers, gyroscopes, and so forth. Logic 522 may provide control commands to the actuators 524a-n to cause one or more components of the robot 520 to traverse along a trajectory, to accomplish one or more programmed tasks, etc. Those control commands include commands that direct the actuators 524a-n to move to traverse one or more trajectories according to techniques described herein. Moreover, the logic 522 may optionally determine positions of one or more actuators 524a-n based on sensor readings and/or other techniques and provide indications of the positions to sensor parameters and model parameters generation system 550 to enable the system 550 to determine sensor parameters and model parameters according to techniques described herein. Also, the logic 522 may optionally determine sensor readings of one or more sensors 528a-m and provide the sensor readings to sensor parameters and model parameters generation system 550 to enable the system 550 to determine sensor parameters and model parameters according to techniques described herein.

Sensor parameters and model parameters generation system 550 may include components of one or more computing systems connected by one or more networks (not depicted) and may generate sensor parameters and model parameters according to techniques described herein. An example of such a computing system is depicted schematically in FIG. 6. Various modules or engines may be implemented as part of sensor parameters and model parameters generation system 550 as software, hardware, or any combination of the two. For example, in FIG. 5 sensor parameters and model parameters generation system 550 includes group determination engine 552, system equations generation engine 554, and sensor parameters and model parameters calculation engine 556. Engines 552, 554, and 556 are described in more detail above with respect to FIG. 4.

While robot 500 and sensor parameters and model parameters generation system 550 are depicted separately in FIG. 5, this is not meant to be limiting. In various implementations, one or more aspects depicted in FIG. 5 as implemented on one of robot 500 or sensor parameters and model parameters generation system 550 may be implemented on the other, may be distributed across both, and/or may be distributed across one or both in combination with other components not depicted in FIG. 5. In implementations where robot 500 and sensor parameters and model parameters generation system 550 are separate, they may communicate over one or more wired or wireless networks (not depicted) or using other wireless technology, such as radio, Bluetooth, infrared, etc. In other implementations, sensor parameters and model parameters generation system 550 may be implemented entirely or in part using logic 522 of robot 500.

Figure 6:
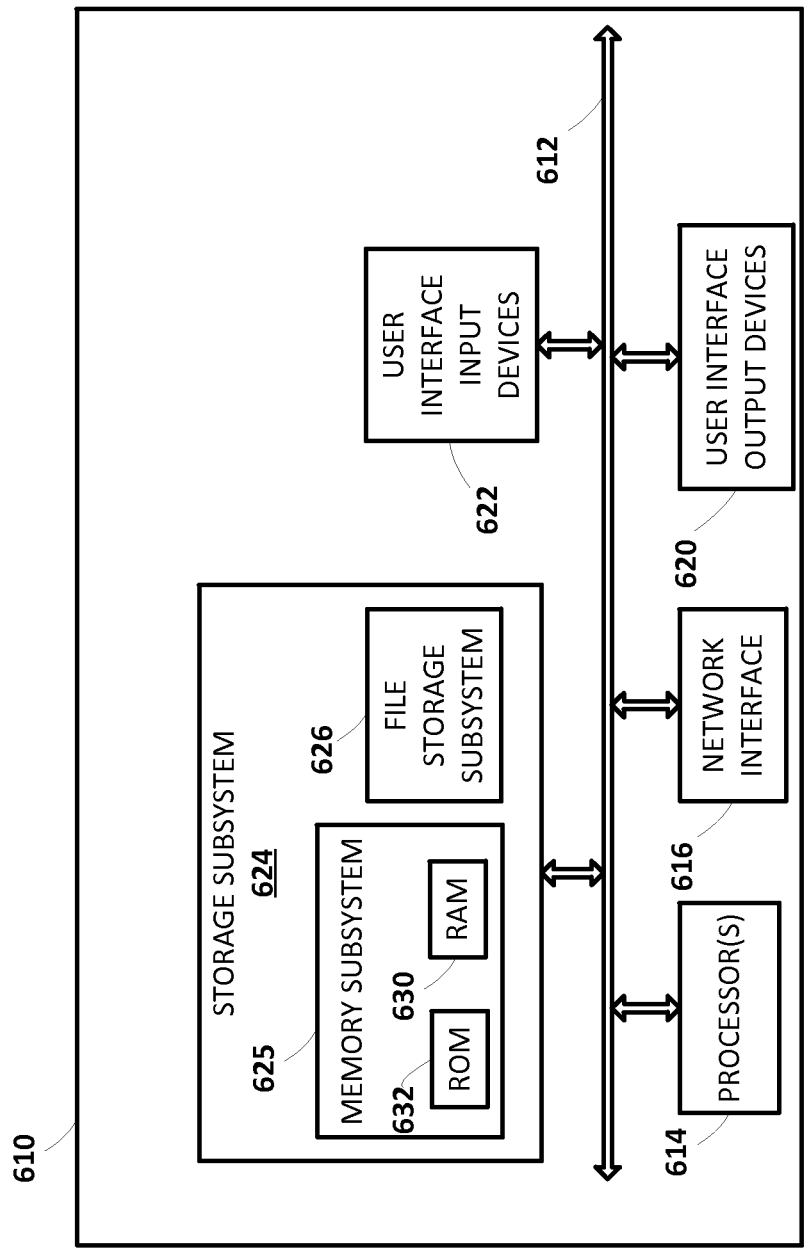
FIG. 6 schematically depicts an example architecture of a computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 100 and/or to implement one or more aspects of logic 522, engine 552, engine 554, and/or engine 556. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a CD-ROM drive, an optical drive, or removable media cartridges. Modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer implemented method, comprising:
    determining, by one or more processors for each of a plurality of instances of a traversal of a robot along a trajectory:
        sensor readings for a plurality of sensors of the robot, each of the sensor readings corresponding to a respective one of the sensors, and the sensors each measuring a corresponding parameter that is in addition to position,
        position values for a plurality of actuators of the robot, each of the position values corresponding to a respective one of the actuators,
        velocity values and acceleration values that are based on the position values, and
        gain values for the sensors of the robot;
    applying the sensor readings, the position values, the velocity values, the acceleration values, and the gain values for each of the instances of a group of the instances as values for known variables of a system equation of the robot, the system equation being an equation of motion that includes sensor models substituted for a plurality of variables of the equation of motion, and the system equation including the known variables and unknown variables, the unknown variables representing unknown sensor biases for the sensors of the robot and unknown model parameters of a dynamic model of the robot;
    generating a solution to each of a plurality of the unknown variables based on the applied sensor readings, position values, velocity values, acceleration values, and gain values for the group of the instances;
    determining sensor biases based on the solutions to the unknown variables representing the unknown sensor biases, wherein the sensor biases each define a bias for a respective one of the sensors;
    determining model parameters based on the solutions to the unknown variables representing the unknown model parameters, wherein the model parameters are for the dynamic model of the robot;
    applying a correction to at least one of the sensors of the robot based on the determined sensor bias for the sensor; and
    applying the model parameters to the dynamic model of the robot.

2. The method of claim 1, wherein the sensor models each include sensor model known variables of the known variables and a sensor model unknown variable of the unknown variables;
    wherein the sensor model unknown variable represents the unknown sensor biases; and
    wherein applying the sensor readings, the position values, the velocity values, the acceleration values, and the gain values for each of the instances of the group as values for the known variables comprises applying the sensor readings and the gain values as the sensor model known variables.

3. The method of claim 2, wherein the sensor models comprise torque sensor models for joint torque sensors of the sensors of the robot.

4. The method of claim 1, wherein applying the sensor readings, the position values, the velocity values, the acceleration values, and the gain values for each of the instances of the group as the values for the known variables for the system equation of the robot comprises:
    generating a plurality of system equations by applying the sensor readings, the position values, the velocity values, the acceleration values, and the gain values for each of the instances of the group as the known variables of the system equation of the robot;
    wherein generating the solution to each of the plurality of the unknown variables based on the applied sensor readings, position values, velocity values, acceleration values, and the gain values comprises:
    generating the solution to each of the plurality of the unknown variables based on the system equations.

5. The method of claim 4, wherein generating the solution to each of the plurality of the unknown variables based on the system equations comprises applying a fitting procedure to generate the solutions.

6. The method of claim 5, wherein the fitting procedure is a least squares fitting procedure.

7. The method of claim 4, wherein generating the solution to each of the plurality of the unknown variables based on the system equations comprises:
    stacking the system equations; and
    generating the solutions based on applying a least squares fitting procedure to the stacked system equations.

8. The method of claim 1, wherein applying the correction to at least one of the sensors of the robot based on the determined sensor biases for the sensor comprises:
    applying a digital correction to future sensor readings of the sensor.

9. The method of claim 1, further comprising:
    controlling the actuators of the robot based on the dynamic model of the robot with the applied model parameters.

10. The method of claim 1, further comprising:
    traversing the robot along the trajectory.

11. A robotic system comprising:
    a plurality of actuators of a robot;
    sensors of the robot, each of the sensors measuring at least one property associated with a corresponding one of the actuators;
    logic providing control commands to the actuators to traverse the robot along a trajectory;
    a group determination engine identifying, for each of a plurality of instances of the traversal of the robot along the trajectory:

sensor readings for the sensors, each of the sensor readings corresponding to a respective one of the sensors, and the sensor readings each being for a corresponding parameter that is in addition to position, position values for the actuators, each of the position values corresponding to a respective one of the actuators, velocity values and acceleration values that are based on the position values, and gain values for the sensors of the robot;

the group determination engine further determining a group of the instances;

a system equations generation engine configured to apply the sensor readings, the position values, the velocity values, the acceleration values, and the gain values for each of the instances of the group of the instances as values for known variables of a system equation of the robot, the system equation being an equation of motion that includes sensor models substituted for a plurality of variables of the equation of motion, and the system equation including the known variables and unknown variables, the unknown variables representing unknown sensor biases for the sensors of the robot and unknown model parameters of a dynamic model of the robot; and a sensor parameters and model parameters calculation engine configured to:
generate a solution to each of a plurality of the unknown variables based on the applied sensor readings, position values, velocity values, acceleration values, and gain values for the group of the instances,
determine sensor biases for the sensors based on the solutions to the unknown variables that represent the unknown sensor biases, and
determine model parameters for the dynamic model of the robot based on the solutions to the unknown variables that represent the unknown model parameters.

12. The system of claim 11, wherein the sensor models each include sensor model known variables of the known variables and a sensor model unknown variable of the unknown variables;
wherein the sensor model unknown variable represents the unknown sensor biases; and
wherein the system equations generation engine applies the sensor readings and the gain values as the sensor model known variables.

13. The system of claim 12, wherein the sensor models comprise torque sensor models for joint torque sensors of the sensors of the robot.

14. The system of claim 11, wherein the system equations generation engine is configured to:
generate a plurality of system equations by applying the sensor readings, the position values, the velocity values, the acceleration values, and the gain values for each of the instances of the group as known variables of the system equation of the robot; and
wherein the sensor parameters and model parameters calculation engine is configured to:
generate the solution to each of the plurality of the unknown variables based on the system equations.

15. At least one non-transitory computer readable medium comprising instructions that, in response to execution of the instructions, cause the following operations to be performed:
determining, by one or more processors for each of a plurality of instances of a traversal of a robot along a trajectory:
sensor readings for a plurality of sensors of the robot, each of the sensor readings corresponding to a respective one of the sensors, and the sensors each measuring a corresponding parameter that is in addition to position,
position values for a plurality of actuators of the robot, each of the position values corresponding to a respective one of the actuators, and
velocity values and acceleration values that are based on the position values;
identifying gain values for the sensors of the robot;
applying the sensor readings, the position values, the velocity values, the acceleration values, and the gain values for each of the instances of a group of the instances as values for known variables of a system equation of the robot, the system equation being an equation of motion that includes sensor models substituted for a plurality of variables of the equation of motion, and the system equation including the known variables and unknown variables, the unknown variables representing unknown sensor biases for the sensors of the robot and unknown model parameters of a dynamic model of the robot;
generating a solution to each of a plurality of the unknown variables based on the applied sensor readings, position values, velocity values, acceleration values, and gain values for the group of the instances;
determining sensor biases based on the solutions to the unknown variables representing the unknown sensor biases, wherein the sensor biases each define a bias for a respective one of the sensors;
determining model parameters based on the solutions to the unknown variables representing the unknown model parameters, wherein the model parameters are for the dynamic model of the robot;
applying a correction to at least one of the sensors of the robot based on the determined sensor bias for the sensor; and
applying the model parameters to the dynamic model of the robot.

* * * * *